United States Patent [19]

Hammond

[11] 4,442,626
[45] Apr. 17, 1984

[54] CLOCHES

[75] Inventor: Errol C. Hammond, Auckland, New Zealand

[73] Assignee: Kerilea International Limited, Auckland, New Zealand

[21] Appl. No.: 292,174

[22] Filed: Aug. 12, 1981

[30] Foreign Application Priority Data

Aug. 15, 1980 [NZ] New Zealand .................. 194678

[51] Int. Cl.³ ...................... A01G 13/04; A45F 1/16
[52] U.S. Cl. .................................. 47/29; 135/119
[58] Field of Search .................. 47/19, 26, 28, 29; 135/1 R, 3 R, 5 R, 7.1 R, 15 CF, 87, 118, 119

[56] References Cited

U.S. PATENT DOCUMENTS

| 2,827,138 | 3/1958 | Roy | 135/1 R |
| 3,165,110 | 1/1965 | Brooks | 47/17 X |
| 3,431,924 | 3/1969 | Simpson | 135/118 |

FOREIGN PATENT DOCUMENTS

| 2241671 | 3/1975 | France | |
| 598729 | 2/1948 | United Kingdom | 47/29 |
| 862895 | 3/1961 | United Kingdom | 47/29 |
| 1095974 | 12/1967 | United Kingdom | 47/29 |
| 1259835 | 1/1972 | United Kingdom | 47/29 |

Primary Examiner—Richard J. Apley
Assistant Examiner—S. R. Crow
Attorney, Agent, or Firm—Stevens, Davis, Miller & Mosher

[57] ABSTRACT

A cloche comprises lengths of sheet material secured over inverted U-shaped frames. The frames each include an outwardly-facing channel within which the material is held by means of securing means, typically in the form of a length of wire with a loop at each end which acts as a torsion spring to hold the material firmly.

7 Claims, 7 Drawing Figures

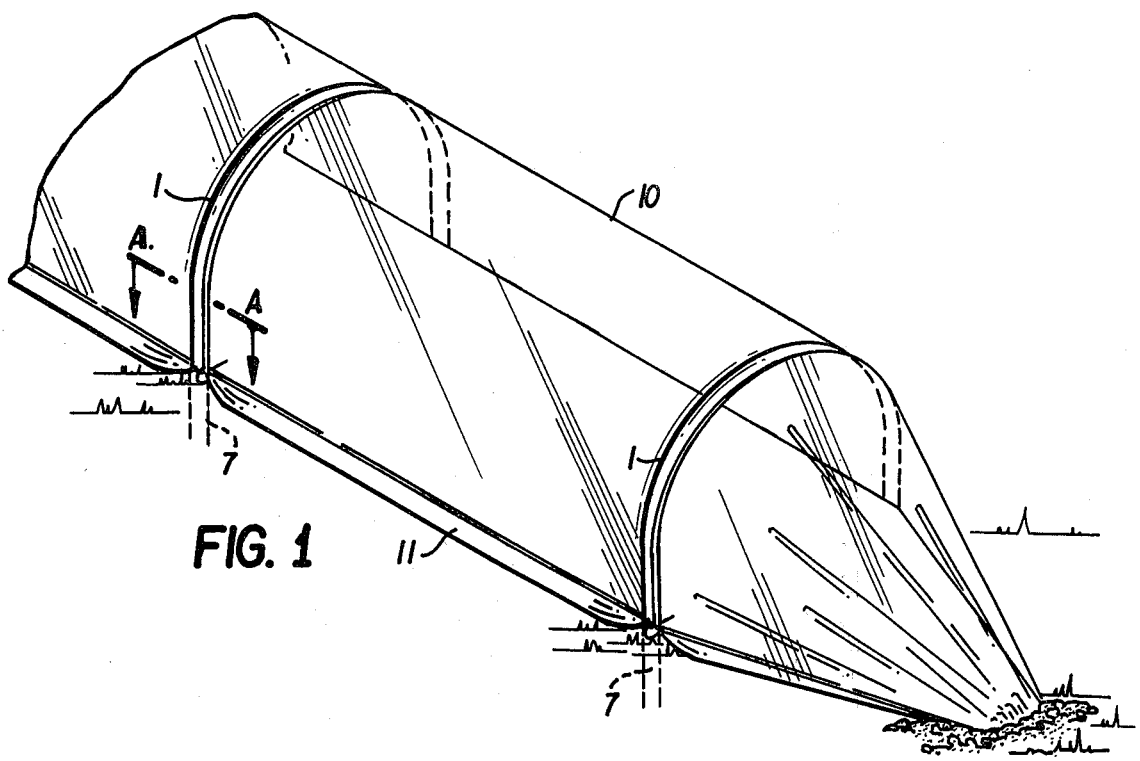
FIG. 1
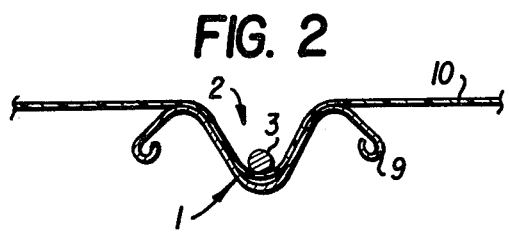
FIG. 2
FIG. 4
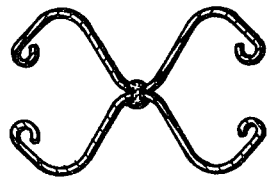
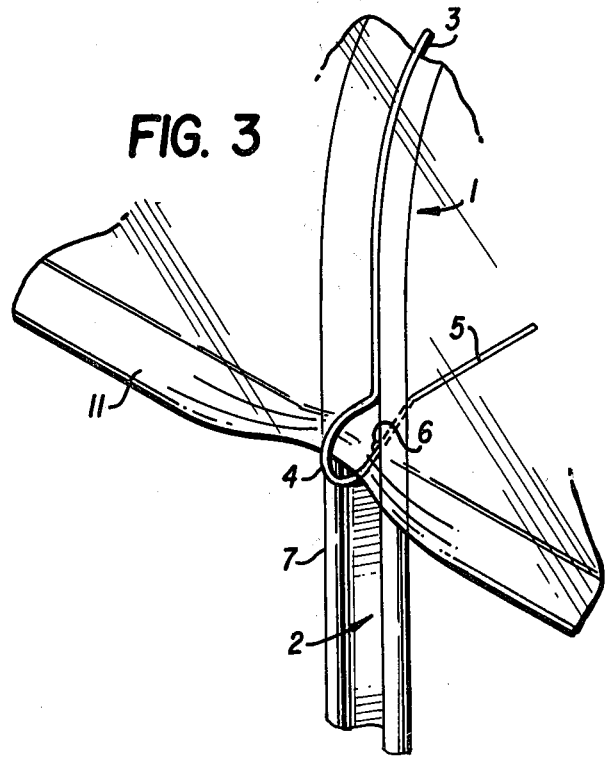
FIG. 3

CLOCHES

BACKGROUND OF THE INVENTION

This invention relates to cloches and to cloche frames.

In the past, cloches formed by placing a covering sheet or film over suitably located sections of an inverted U-shaped frame have had problems with securing the covering to the frame in a manner which will hold the covering satisfactorily in place and minimise the covering's tendency to become dislodged and/or tear in adverse weather conditions. Traditional methods have tended to be somewhat time consuming, labour intensive and difficult to erect, maintain and dismantle. These problems have reduced the effective life of the covering. Joining more than one length of sheeting to form a covering has also been difficult.

Earlier U.S. patent specifications relating to cloches are U.S. Pat. Nos. 558,346 (Boyd), 1,692,229 (Smith), 1,766,455 (Rights et al), 1,910,501 (Schindler), 2,226,812 (Goldberg), 3,088,244 (Commisso), 3,165,110 (Brooks), 3,240,217 (Bird et al), 3,791,077 (Ventimiglia) and 3,800,468 (de Graff). Other patent specification are British specification Nos. 1192591 (Ender), 1227863 (Sovap SA), 1276171 (Bush Plastics Ltd), French specification Nos. 1325984 (di Galante), 2241671 (Richel) and German specification No. 2557699 (Rup). None of these, however, have overcome all of the difficulties to which the present invention is addressed.

Some of these earlier inventions have been partially successful in overcoming some of the above mentioned problems but often the means of overcoming these problems have been cumbersome, time-consuming and expensive.

The object of the present invention is to provide a means of going some way towards reducing these problems.

SUMMARY OF THE INVENTION

In a first aspect, the present invention consists in a cloche frame comprising a substantially U-shaped support and a securing means, the support having an outwardly facing channel running substantially along the length of the outer surface and the securing means being adapted to be engaged within the channel in order to secure a covering in the channel.

In a second aspect the present invention consists in a cloche comprising a plurality of inverted substantially U-shaped supports, a plurality of securing means and a covering, the supports each having an outwardly facing channel running substantially along the length of the outer surface of the U-shape, and the securing means being engaged within the channels so that the covering is secured in the channels thereby.

BRIEF DESCRIPTION OF THE DRAWINGS

FIG. 1 is a perspective view of a cloche built in accordance with the present invention;

FIG. 2 is a diagrammatic representation of a cross-section along line AA of FIG. 1;

FIG. 3 is a detail of the foot of the frame of the cloche in FIG. 1;

FIG. 4 is a cross-sectional view of an alternative cloche frame in accordance with the present invention;

DESCRIPTION OF THE PREFERRED EMBODIMENTS

Figure 5A:
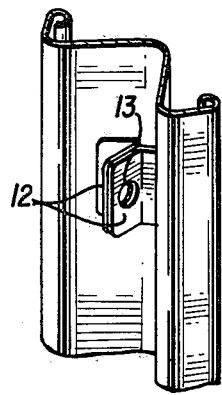
FIGS. 5a and 5b illustrate variations on a detail of the cloche frame of the present invention.

In the preferred form of the invention of the cloche frame comprises a substantially U-shaped support formed from a strip of galvanized steel by passing it through the nip of a pair of suitably shaped rollers, the shape of the rollers being such that after passing through the rollers the cross section of the strip of galvanized steel is substantially M-shaped. The strip of galvanized steel so formed is bent by a jig to the desired U-shape so that the top of the M-shaped cross-section forms the outwardly facing channel 2 which runs along the entire length of the outer surface of the U-shape. Many other materials, such as aluminium or plastics, may also be used instead of galvanized steel. The strip may be pressed out as described, or it may be moulded or extruded. However, when the strip is of metal, the shape is arranged so that no sharp edges are exposed which may tend to cut the covering (referred to below). In the illustrated embodiments this is done by rolling the edges of the strip over.

In the preferred form of the invention the securing means is a piece of high tensile galvanized wire 3 bent into the shape of a U to conform to, and fit securely into, the outwardly facing channel formed by the top of the M-shaped cross-section of the U-shaped support. Each free end of the securing means is bent to form a loop 4 with the ends 5 directed towards the centre of the U. The location of the loop is such that the end sections 5 of the wire can pass through holes 6 which are suitably located in the centre of the M-shaped cross-section, adjacent the free ends of the U-shaped support. The loop is shaped to act as a torsional spring, so that it holds the wire taut within the channel.

If a more flexible securing means is used, for example a moulded length of rubber or tension spring assembly, then instead of apertures formed in the centre of the M-shaped cross-section, lugs are formed in the centre of the M-shaped cross-section adjacent the free ends of the securing means. The lugs are adapted to secure the ends of the securing means, so that the securing means is held firmly within the outwardly facing channel of the substantially U-shaped support. Such lugs could be formed by punching out a support section from the galvanized steel from the centre of the outwardly facing channel at or near the free ends of the U-shaped support and by bending the punched strip outwards. The securing means can be attached to these lugs.

For example, FIG. 5a shows lugs 12 pressed out from the centre channel of the U-shaped support. The lugs are squeezed together and an aperture 13 is provided, within which the securing means can be held.

Figure 5B:
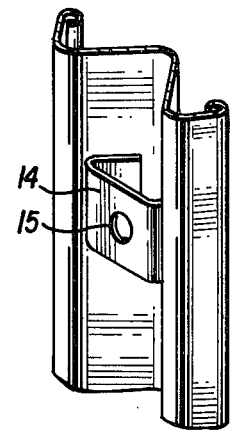

Alternatively, suitable lugs could be attached to the U-shaped support in the same location by rivetting, spot welding, by bolting them on or by any of a number of other attachment methods. FIG. 5b illustrates a lug 14 spot welded within the channel, and again provided with a locating aperture 15. However, the aperture is optional, as a securing means could be held around the lug itself.

Many other arrangements are also possible.

The free ends 7 of the support may be pointed to make for easier location in the ground.

Figure 6:
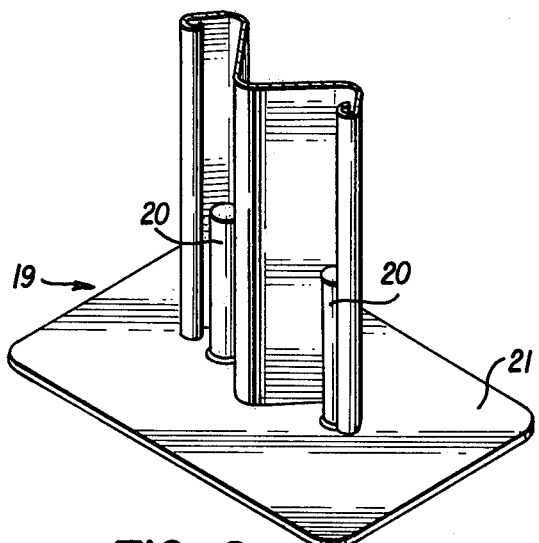
FIG. 6 illustrates a variation on another detail of the cloche frame.

Alternatively, small stands 19 (FIG. 6) can be located on the free ends of the U-shaped support so that the U-shaped support can stand independently. Such stands could be riveted, spot welded, nailed or screwed on to the U-shaped support. The illustrated stand 19 is provided with short pegs 20 which are welded to a base 21, and the U-shaped support is spot welded to the pegs. However, many other arrangements are possible.

Cloche frames provided with such stands can have the advantage that the position of the cloches, once erected, can be easily adjusted to allow, for example, for increased ventilation.

In its usual form the cloche consists in a number of U-shaped supports located at appropriate intervals. The supports are placed parallel to each other and in a straight line. The free ends 7 of the U-shaped supports, beyond the locating apertures 6, are pushed into the ground. These ends may be of any suitable length to ensure that the frames are held securely in the ground.

Over the top of the supports is placed a length 10 of sheeting the width of the sheet being preferably sufficient to form a covering over the entire outwardly facing portion of that part of the U-shaped support which is above the ground, leaving enough for a flap 11 to lie along the ground on each side. The length of covering material is then secured to each U-shaped support by placing the supporting means 3 over the covering, the supporting means being located in such a manner that it secures the covering in the outwardly facing channel. In FIG. 2 the wire 3 is shown spaced from the bottom of the channel 2 although, in use, the wire will fit firmly and snugly into the channel, gripping the covering 10 between the wire and the frame 1.

The covering may be reinforced plastics sheeting, such as clear polythene or copolymer, or it may be a knitted or woven shade cloth. Many different covering materials may be used.

If desired, the bent ends of the wire 3 may be pushed through the covering so that the bent ends can pass through the holes 6 in the channel, the securing means thereby holding the covering firmly into the outwardly facing channel 2 of each U-shaped support.

Preferably, however, the edge of the covering is tucked up around the ends of the wire retainers, fitting within the loops at the ends of the wires, as shown in FIG. 3.

At the end of the cloche, the covering is typically simply gathered together and buried, as shown in FIG. 1. However many other end configurations may also be used instead.

Sections of the covering can be joined readily by placing a cloche frame where the covering has to be joined to another sheet, and securing the free end of both sheets together into the outwardly facing channel of the U-shaped support in the same manner as already described.

When it is desired to move the assembled cloche, the cloche can be dismantled, packed and stored, the frames being nested, or re-constructed in an alternative location. Suitable lengths or sections of the assembled cloche can also be collapsed together in a concertina fashion and stored or moved to a new location where it can be rapidly erected.

Two formed metal strips may be joined back to back, being as shown in cross-section in FIG. 4, being welded, riveted or otherwise joined together continuously or at intervals along the connecting bases of the channels, to form a frame of high strength. In this manner, quite large frames may be built with the frames spaced at wide intervals, and it remains a strong structure.

The cloche frames of the present invention may typically be built in various sizes such as 0.6, 1, 1.5 and 2 meters in width (being typically 29, 47, 71 and 95 cm in height respectively) although the invention is in no way restricted to these dimensions.

Figure 7:
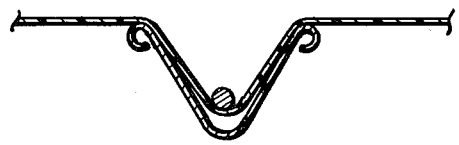
FIG. 7 is a cross-sectional view of another form of cloche frame according to the present invention.

Various modifications may be made to the above without departing from the scope of the present invention as claimed. For example, the cloche frame need not be M-shaped in cross-section, but may simply comprise an outward facing V without the side flanges 9, as shown in the cross-sectional view of FIG. 7.

The frame or cloche of the present invention can be used for any of a variety of purposes. For example it may be used for various agricultural and horticultural applications, depending upon the local climate and conditions, and upon the nature of the plants being grown. For example, it may be used as a greenhouse where the outside temperatures may be too cool for the plants, or as a shade cover where they may be too hot. It may be used to exclude pests, such as insects, birds, or fungi, from the plants, and thus enable growers to produce crops which are free of any pesticide. It may be used to ensure the plants are isolated from other plants where this is required for selective breeding purposes. It may be used for controlled spraying or fumigation. It may be used to assist water retention, and thus reduce the need for extensive irrigation in dry climates, and may also serve to protect the plants against wind and sand.

It may also be used for any of a number of other purposes which have nothing to do with plant growing, such as for the retention or protection of animals, as a wind tunnel, for protecting a trench and so on. It may be used for desalination, for dessication and dehydration of fruits, vegetables or meats, or it may be used to provide temporary dwellings. The list is endless.

I claim:

1. A cloche frame comprising a substantially U-shaped non-tubular support and a securing means, said support being formed from a flat strip and having substantially M-shaped cross-section, the top of the M being outwardly facing to provide a channel on the outer surface of the support, the free ends of the support each having an attachment means provided in the channel on the outer surface of the support; said securing means being adapted to be engaged within the channel in order to secure a covering in the channel and being substantially U-shaped when engaged within the channel, the free ends of the securing means being adapted for attachment to the attachment means of the support.

2. A cloche frame as claimed in claim 1, wherein the attachment means comprises a pair of apertures provided in the outwardly facing channel of the support, each aperture being located substantially adjacent a respective free end of the U-shaped support and being adapted to be engaged by the securing means, the free ends of the securing means being adapted to fit through the apertures.

3. A cloche frame as claimed in claim 1 wherein the securing means is made of a substantially flexible material, the construction and arrangement being such that, in use, it holds the covering securely within the outwardly facing channel.

4. A cloche frame as claimed in claim 3 wherein the securing means comprises a length of wire.

5. A cloche frame as claimed in claim 4, wherein the length of wire is formed with an outwardly directed loop adjacent each end thereof, the ends themselves being directed inwardly with respect to the support, each said loop acting as a torsional spring to further secure the wire support.

6. A cloche frame as claimed in claim 1 wherein the support is formed from a strip of sheet metal.

7. A cloche comprising a plurality of inverted substantially U-shaped non-tubular supports, a plurality of securing means and a covering, each of said supports being formed from a flat strip and having a substantially M-shaped cross-section, the top of the M being outwardly facing to provide a channel on the outer surface of the support, the free ends of the support each having an attachment means provided in the channel on the outer surface of each support; each of said securing means being adapted to be engaged within the outwardly facing channel of a respective support in order to secure the covering in said channel and being substantially U-shaped when secured in said channel, the free ends of each of said securing means being adapted for attachment to the attachment means of a respective support, thereby securing the covering within the outwardly facing channels of the supports.

* * * * *